Dec. 15, 1959  J. E. WALDRUM  2,917,242
AERIAL SPRAY DEVICE
Filed Aug. 8, 1958  2 Sheets-Sheet 1
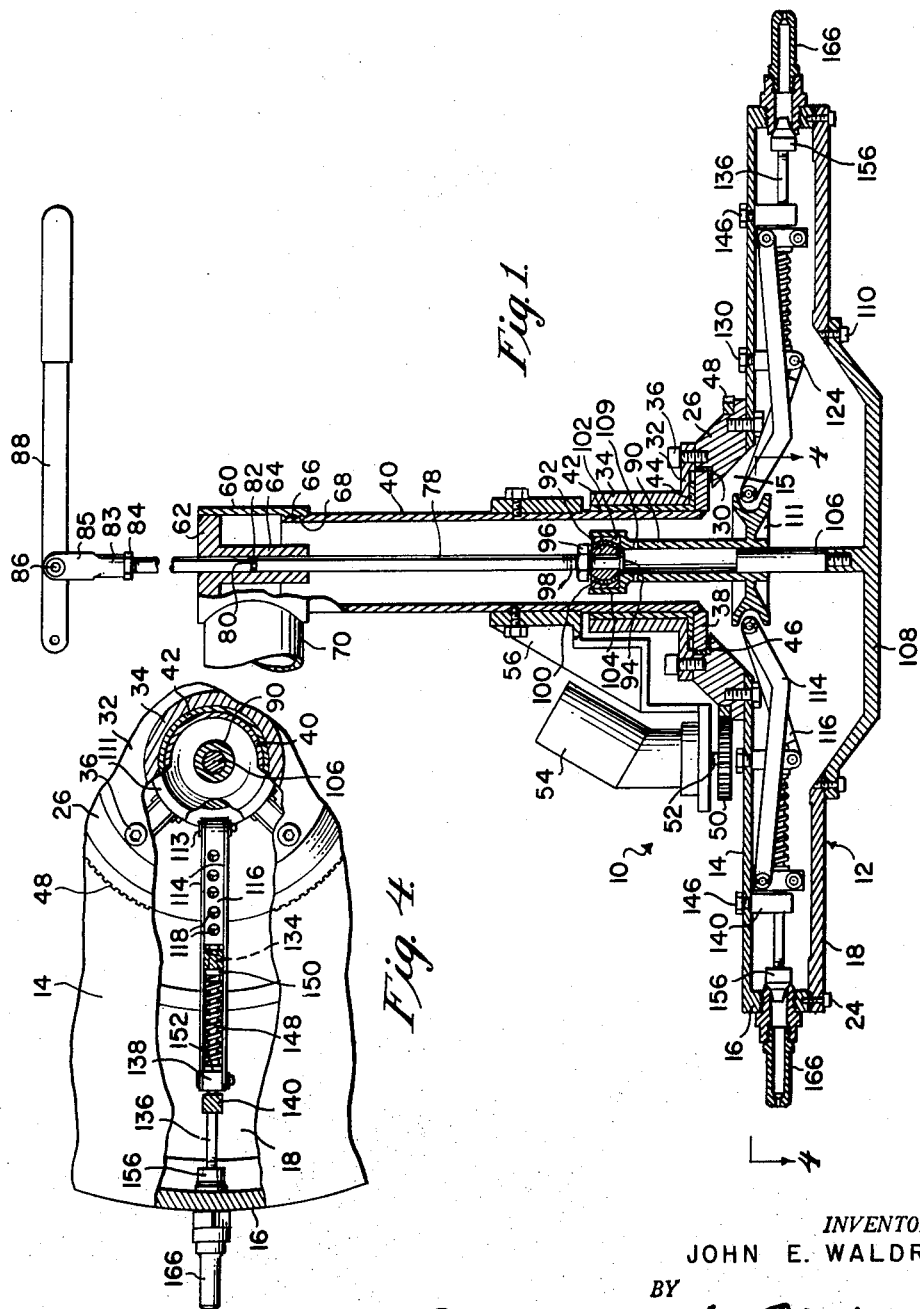
INVENTOR.
JOHN E. WALDRUM
BY
Caesar and Rivise
ATTORNEYS.

Dec. 15, 1959    J. E. WALDRUM    2,917,242
AERIAL SPRAY DEVICE
Filed Aug. 8, 1958    2 Sheets-Sheet 2
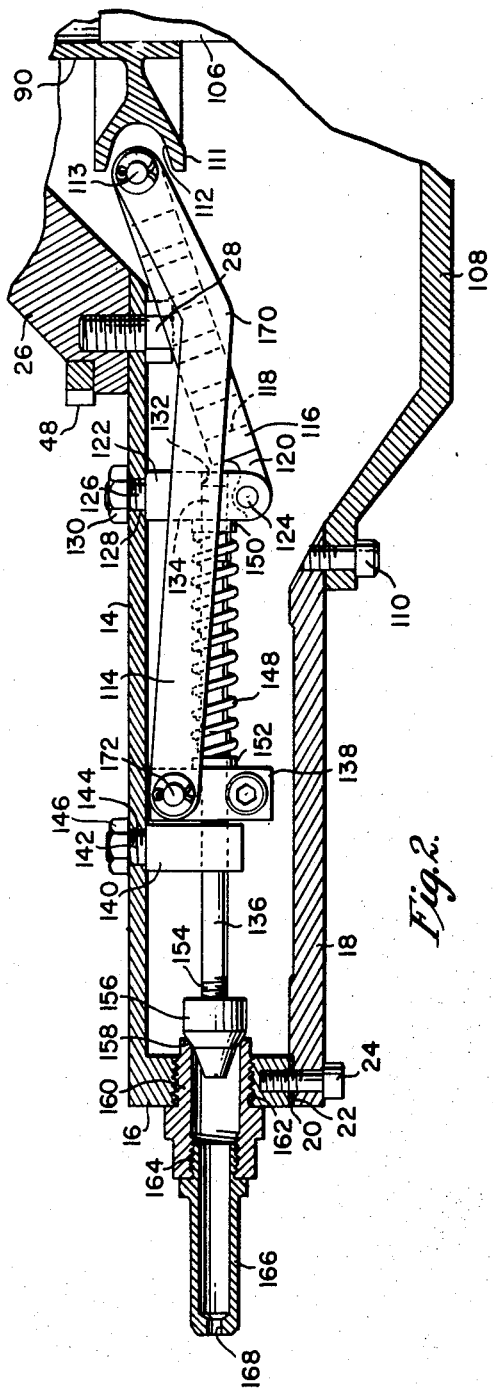
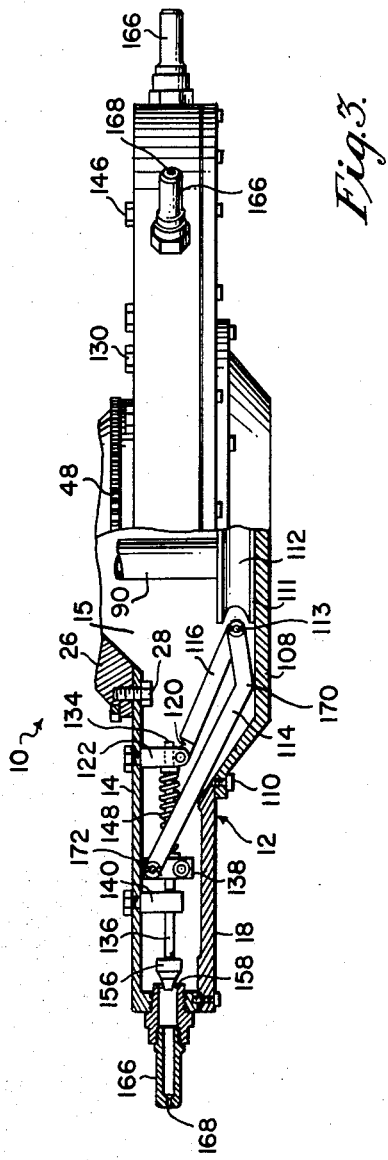
INVENTOR.
JOHN E. WALDRUM
BY
Caesar and Rivise
ATTORNEYS.

United States Patent Office 2,917,242
Patented Dec. 15, 1959

2,917,242

AERIAL SPRAY DEVICE

John E. Waldrum, Ambler, Pa., assignor to Amchem Products, Inc., Ambler, Pa., a corporation of Delaware Application August 8, 1958, Serial No. 753,948

10 Claims. (Cl. 239—225)

This invention relates to a spray device; and it particularly relates to a spray device of the rotary type adapted to be used on an aircraft during flght.

The use of aerial spraying for the control of weeds and other undesirable vegetation in large areas is becoming of increasing importance. The aircraft used for spraying may be either of the fixed or rotary wing type but, in either case, a much larger area can be effectively covered in this manner than would otherwise be possible. Nevertheless, certain problems have presented themselves in connection with such aerial spraying which have greatly inhibited its total effectiveness. Among such problems are adequate control of the spray patterns, especially for varying altitudes of the aircraft, adequate control of the spray system to prevent accidental discharge of the spray, adequate control of the system to immediately cut off the spray if there should be an accidental discharge, and adequate control of the system to eliminate the effects of centrifugal force on opening and closing of the spray nozzles.

It is one object of the present invention to overcome the above and other difficulties by providing an aerial spray device which is under complete and effective control of the operator at all times.

Another object of the present invention is to provide an aerial spray device wherein the spray pattern may be easily regulated regardless of the altitude of the aircraft.

Another object of the present invention is to provide a rotatable aerial spray device which, during rotation, is positively locked in selected open or closed condition regardless of the operation of centrifugal force.

Another object of the present invention is to provide an aerial spray device which does not tend to upset the dynamic equilibrium of either itself or of the supporting aircraft.

Other objects and many of the attendant advantages of this invention will be readily appreciated as the same becomes better understood by reference to the following detailed description when considered in connection with the accompanying drawings wherein:

Fig. 1 is a side view, partly in section and partly in elevation, of a spray device embodying the present invention, the nozzles being shown in the closed position.

Fig. 2 is an enlarged detailed sectional view of a portion of Fig. 1.

Fig. 3 is a side view partly in section and partly in elevation, somewhat similar to Fig. 1 except that the upper portion of the device has been deleted and the nozzles are shown in the open position.

Fig. 4 is a view taken on line 4—4 of Fig. 1.

Referring now in greater detail to the drawings wherein similar reference characters refer to similar parts, there is shown a spray device, generally designated 10, comprising a hollow, disc-like head 12 consisting of a top plate 14 having a downwardly extending peripheral flange 16, and a bottom plate 18. The peripheral flange 16 forms the side wall of the disc-like head and is held against a washer 20, seated in a slight recess 22 on the upper peripheral surface of the plate 18. The plates 14 and 18 are held together by screws 24 which are threadedly engaged in mating tapped holes in the plate 18 and flange 16.

The upper and lower plates 14 and 18 are each centrally apertured, the central aperture 15 in the upper plate 14 being encompassed by an upstanding, inwardly and upwardly tapered boss 26. The boss 26 is secured to the plate 14 around its central aperture by means of screws 28 while, at its uppr end, the boss is provided with an internal shoulder 30. In spaced relation to shoulder 30 is the horizontal flange 32 of a vertical sleeve 34; the flange 32 being connected to the upper end of boss 26 by screws 36.

The shoulder 30 and flange 32 rotatably encompass a horizontal flange 38 at the lower end of a stationary tube 40. A vertical sleeve bearing 42, having a horizontal flange 44 at its lower end, is positioned between the tube 40 and its associated parts on the one side and the sleeve 34 and its associated parts on the other side. Similarly an annular bearing 46 of L-shaped cross-section is positioned between shoulder 30 and flange 38 of tube 40.

Positioned on the lower external surface of boss 26 is an annular gear 48 which is in mesh with a drive pinion 50. The pinion 50 is mounted on a shaft 52 connected to or integral with the motor shaft of an electric motor 54 mounted on a supporting bracket 56.

The motor 54 is connected by electrical wiring, not shown, to a source of electrical energy in the body of the aircraft. Although not shown, there is also provided in the body of the aircraft, in a position accessible to the pilot or operator of the spray, a rheostat for adjusting the speed of rotation of the motor 54. This rheostat control has not been illustrated since it is a common form of motor control means and, by itself, forms no part of the present invention.

The upper end of tube 40 is closed by a coupling member 60 having an upper wall 62 from which depends a vertical bearing sleeve 64. The coupling 60 is internally threaded at 66 to engage with external threads 68 on the upper end of tube 40. From one side of the coupling member 60 there extends a lateral conduit 70 leading to a source of fluid pressure (not shown).

Extending through the bearing sleeve 64 is a shaft 78 having a peripheral groove 80 in which is positioned an O-ring 82. The shaft 78 extends through the upper wall 62 of the coupling member 60 and, at its upper end the shaft is threadedly engaged with an internal threaded sleeve 83. The sleeve 83 has a nut portion 84 at its lower end and, at its upper end, is provided with a bracket consisting of a pair of upstanding apertured ears 85 between which is pivotally connected, as by pivot pin 86, a lever 88. This lever 88 is accessible to the pilot or spray operator.

The lower of shaft 78 extends down through tube 40 to a position wherein it is connected by a universal pivot to a sleeve 90. This universal pivotal connection is formed by a truncated ball 92 positioned on the lower end of the shaft 78 between a head 94 on the end of the shaft and a nut 96 threaded on an enlarged threaded portion 98 of the shaft. The ball 92 is positioned within a socket defined by a washer 100 seated in a generally spherical recess in a plug 102 positioned in an enlarged head 104 at the upper end of the sleeve 90.

The lower end of the sleeve 90 is telescopically positioned on a post 106 extending up from a recessed plate 108 covering an enlarged central aperture in the plate 18. The plates 108 and 18 are releasably secured together by screws 110. Vent holes 109 are provided in the sleeve 90 to permit entrance and exit of air as the sleeve 90 moves up or down on post 106.

At the lower end of sleeve 90 is a collar 111 having a peripheral groove 112. Loosely positioned within this groove 112 are a plurality of annularly-spaced pivot pins 113, each pivotally connecting the ends of a pair of spaced, parallel links 114 to an inner link or lever 116 positioned therebetween. The lever 116 is provided with apertures 118 for decreasing its weight while maintaining its strength and rigidity, and is also provided with a reduced finger portion 120 which is pivotally connected to a bracket 122 by a pin 124. The bracket 122 is provided with a reduced, threaded stem 126 which fits through a threaded opening 128 in the top wall 14 and is held in place by a nut 130.

The bracket 122 is provided with a channel 132 in which is slidably positioned the reduced end 134 of a rod 136. This rod 136 extends through and is connected to a movable bracket 138. It also extends through a second fixed guide or bearing 140 provided with a reduced, threaded stem 142 which is retained in a threaded opening 144 in plate 14 by a nut 146, similarly to bracket 122.

A coil spring 148 surrounds rod 136 between a pair of slidable collars 150 and 152; the collar 150 bearing against bracket 122 and the collar 152 bearing against bracket 138.

At the outer end of the rod 136 is provided a threaded end portion 154 to which is threadedly secured a valve head 156. The threaded connection between the head 156 and rod 136 permits longitudinal adjustment of the head on the rod, thereby permitting adjustment of the head relative to the valve seat.

The valve seat, indicated at 158, is positioned at the inner end of a threaded coupling 160. The coupling 160 is externally threaded at 162 for securement in a corresponding threaded opening of the peripheral wall 16, and is internally threaded at 164 to engage with the externally threaded nipple portion of a nozzle 166 having a spray aperture 168.

The links 114 each comprise two offset arms integrally connected by an elbow portion 170; the shorter arms being connected to the pivot pin 113 and the longer arms being pivotally connected to the upper end of bracket 138 by a pivot pin 172.

A plurality of annularly-spaced valve and linkage assemblies, such as described above, are provided within the head 12, each assembly coinciding with an individual nozzle 166. The number and spacing of the nozzles and their corresponding valve assemblies may vary depending on the operating conditions.

In operation, the fluid spraying composition is passed from the source in the aircraft (not shown) down through conduit 70 and then through tube 40 into the head 12. The spraying fluid may be either gravity or force fed through this path, and may be controlled at its source by any ordinary control means, such as a solenoid valve, operated by the pilot or operator of the spray mechanism.

When a spray operation is begun, the pilot or spray operator actuates the motor 54 to rotate the head 12 through gearing 48 and 50. The speed of rotation of the spray head is controlled by the aforementioned rheostat or the like connected to the motor circuit. The operator then pushes the shaft 78 down to cause downward motion of sleeve 90 and collar 111. This downward movement of collar 111 moves pivot pin 113 down to change the position of linkage 114–116. In this position (as shown in Fig. 3), the valve is open. It is, furthermore, held in such open position by the spring 148 even under the counter action of centrifugal force due to the change of position of the linkage whereby the moment of force around the pivot 124 is changed. In this position, the radially outward force of both the spring 148 and centrifugal force is changed by the position of the linkage to a force exerted in the opposite direction. Consequently, the tendency of the valve to remain open is actually increased by the action of the spring and of centrifugal force.

On the other hand, when it is desired to shut off the spray, the shaft 78 is moved upwardly which causes collar 111 to lift up the pivot 113 to the position shown in Fig. 1 and thereby causes links 114 to move bracket 138 outwardly. This closes valve head 156 against its seat. In this position, the spring as well as centrifugal force act to push the valve head onto its seat.

Since the motor 54 can be operated at variable speeds, it is possible to spray a predetermined swath size from a given altitude by simply adjusting the speed of rotation of the motor and therefore of the spray head. In this manner the spray pattern can be easily adjusted to prevent spraying of areas other than those desired to be sprayed.

Obviously many modifications and variations of the present invention are possible in the light of the above teachings. It is, therefore, to be understood that within the scope of the appended claims, the invention may be practiced otherwise than as specifically described.

What is claimed as the invention is:

1. A spraying device comprising a rotatable tube, means operatively connecting said tube to a source of sprayable material, means operatively connected to said tube for rotating said tube, a hollow spray head at one end of said tube, an axially movable control shaft extending through said tube into said spray head, means operatively connecting said shaft to a linkage assembly within said spray head for adjusting the operating position of said linkage assembly, at least one nozzle on said spray head, a valve mechanism in said spray head operatively connected to said nozzle for opening and closing said nozzle and means operatively connecting said linkage assembly to said valve mechanism.

2. The spraying device of claim 1 wherein there are a plurality of nozzles, each extending radially from the outer periphery of said spray head and each being operatively connected to an individual linkage assembly, said nozzles being spaced from each other circumferentially of said spray head and said linkage assemblies all being operatively connected to said control shaft.

3. The spraying device of claim 1 wherein said means for rotating said tube comprises an annular gear connected to said tube and in mesh with a pinion on the motor shaft of a variable speed motor, said motor being operatively connected to a means for varying its speed.

4. A spraying device comprising a spray head rotatably connected to a support, said support being adapted to be connected to an aircraft, said spray head being hollow and in fluid connection with a source of sprayable material, at least one nozzle extending radially from the periphery of said spray head, means in said spray head operatively connected to said nozzle for opening and closing said nozzle, said means including a valve seat, a piston valve movable toward and away from said valve seat, and linkage connecting said piston valve to a control shaft movable axially of said spray head, said linkage having a connecting pivot which is adjustable axially of said spray head by said control shaft.

5. The spraying device of claim 4 wherein said spray head is operatively connected to a variable speed motor for rotation thereby.

6. The spraying device of claim 4 wherein there are a plurality of nozzles in annularly spaced relationship to each other on the periphery of said spray head, each nozzle having an individual valve means operatively associated therewith, the linkage of all of said valve means extending radially toward the axis of rotation of said spray head and being operatively connected to said common control shaft.

7. A spraying device comprising a disc-like, hollow spray head, at least one spray nozzle extending radially from the periphery of said spray head, means operatively connected to said spray head for supporting said spray head for rotation on its central axis, means connecting said spray head to a source of sprayable material, a control shaft extending axially from the interior of said spray head to a control area, a collar on asid control shaft movable axially with said shaft, a peripheral groove on said collar, linkage means including a pair of links having a connecting pivot therebetween, said connecting pivot being loosely positioned in said groove, one of said links being also pivotally connected to a fixed support while the other link is pivotally connected to a movable support, said fixed support being positioned between said connecting pivot and said movable support, said movable support being mounted on a radially extending, radially movable rod within said spray head and being movable with said rod, the pivotal connection between said other link and said movable support being offset from said radially extending rod, said other link having two longitudinally offset portions connected by an intermediate elbow portion, a valve head at the radially outer end of said radially extending rod, and a valve seat at the inlet end of said spray nozzle in a position to receive said valve head.

8. The spraying device of claim 7 wherein a coil spring is positioned around said radially extending rod between said fixed and movable supports.

9. The spraying device of claim 8 wherein there are a plurality of spray nozzles spaced from each other circumferentially of said spray head, each nozzle being associated with individual valve and linkage means all operatively associated with said control shaft for simultaneous actuation thereby.

10. A spraying device comprising a hollow spray head, means supporting said spray head for rotation, means operatively connecting the interior of said spray head to a source of sprayable material, at least one radially extending nozzle on the periphery of said spray head, valve means within said spray head and being operatively associated with said nozzle, means operatively connected to said valve means for selectively opening and closing said valve means, centrifugally-actuated locking means operatively connected to said valve means for selectively and positively locking said valve means in a selected position, said locking means comprising a pair of links pivotally connected to each other by a connecting pivot, one of said links being connected to said spray head and the other being pivotally connected to said valve means, a spring on said valve means offset from the pivotal connection between the link and the valve means, and control means operatively connected to said links to adjust the position of the pivotal connection between the links.

References Cited in the file of this patent
UNITED STATES PATENTS

| | | |
|---|---|---|
| 1,997,450 | Burkle | Apr. 9, 1935 |
| 2,427,987 | Wilson | Sept. 23, 1947 |
| 2,488,554 | Otterson | Nov. 22, 1949 |
| 2,504,580 | Pierson | Apr. 8, 1950 |
| 2,665,092 | Sands | Jan. 5, 1954 |
| 2,766,065 | Joyslen | Oct. 9, 1956 |
| 2,773,721 | Pedrick | Dec. 11, 1956 |